UNITED STATES PATENT OFFICE.

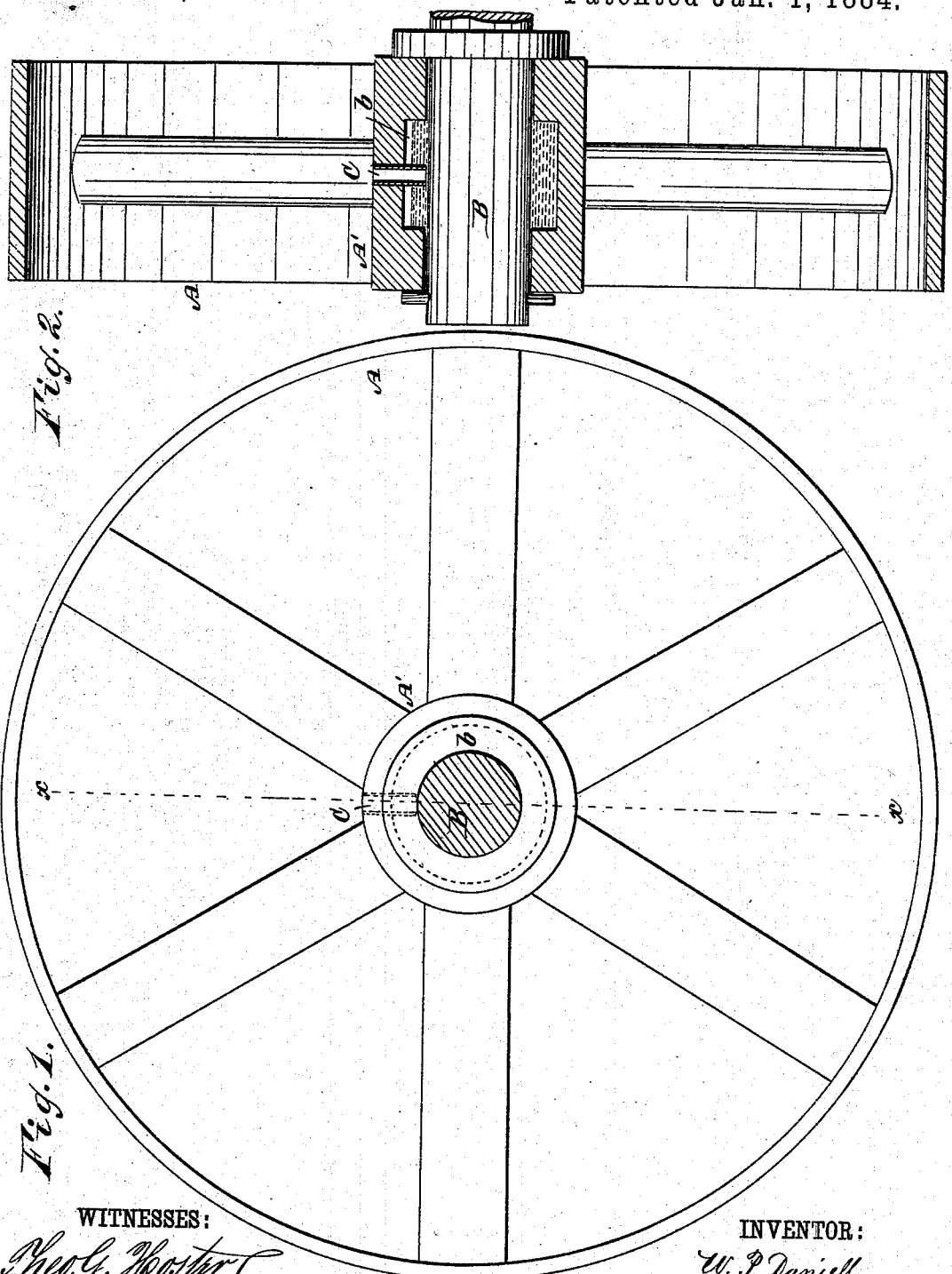

WILLIAM P. DANIELL, OF GIRARDVILLE, PENNSYLVANIA.

DEVICE FOR LUBRICATING WHEELS AND PULLEYS.

SPECIFICATION forming part of Letters Patent No. 291,307, dated January 1, 1884.

Application filed November 12, 1883. (No model.)

*To all whom it may concern:*

Be it known that I, WILLIAM P. DANIELL, of Girardville, in the county of Schuylkill and State of Pennsylvania, have invented certain new and useful Improvements in Means for Lubricating Wheels and Pulleys, of which the following is a full, clear, and exact description.

This invention consists in an improved lubricating-hub for loose wheels and pulleys of different kinds, including car, wagon, cart, or carriage wheels running loosely upon their axles, and various pulleys or wheels running loosely upon their shafts.

It consists in providing the hub of the wheel or pulley, having an interior chamber in open communication with the bore of the hub, with an oiling-tube arranged to project within said chamber to the full extent of the depth thereof, so that the inner end of said tube is in line, or thereabout, with the walls of bore of the hub. By this tubular projection within the chamber of the hub, the oil is prevented, as the wheel or pulley is rotated, from running out of said chamber otherwise than along the axle or shaft to be lubricated.

Reference is to be had to the accompanying drawings, forming part of this specification, in which similar letters of reference indicate corresponding parts in both the figures.

Figure 1 is a side view of a loose wheel or pulley mounted upon its shaft, and with my invention applied. Fig. 2 is a transverse section of the same upon the line *x x* in Fig. 1.

A A' indicate the loose wheel or pulley, and B its shaft. The hub portion A' is made with the usual oil receptacle or chamber, *b*, extending around the interior of the hub and in open communication with the bore thereof. Ordinarily the oil is introduced through a simple radial hole in the hub, connecting its exterior with said recess or chamber *b*, so that when said wheel is rotated or left standing with its oiling-hole in a downward position, much oil is wasted by escape through said hole. This is the cause of no small annoyance and loss. Thus, in the case of the loose-running wheels of cars used in mines, it is seldom that the oil-hole in each wheel of the same car is in a position to pour oil into at the same time. Consequently when the oil is put into one wheel the car has to be moved to bring the oiling-hole of another wheel into receiving position, thereby causing the oil which was put into the first wheel to escape from the hole it was introduced by while the second wheel is being charged with oil, and so on for the entire set of wheels. In this way a large portion of the oil runs to waste without having accomplished the purpose for which it was intended, so that in many cases more oil is wasted than actually used on the cars. This waste I, to a large extent at least, avoid by inserting or casting in the wheel-hub a tube, C, in open communication with the exterior of the hub and arranged to project within the chamber or recess *b* to the full extent of its depth, and so that its inner end is in line with the walls of the bore of the hub, or thereabout. By means of this tubular feeding projection within the chamber *b*, the oil, when once put into said chamber, is prevented from escaping by the way it entered or by any other way than that which serves to lubricate the axle as it passes.

So far as the escape of oil is concerned, it is immaterial, under this construction, in what position the oil-hole is; and in the case of a car-wheel, the car might stand for a prolonged period after being oiled without entailing much or any waste, the oil remaining in the chamber *b*, ready to commence lubrication of the axle so soon as the wheel begins to move. Thus not only is oil saved, but the necessity for lubricating the wheels of the car is rendered much less frequent than heretofore.

Having thus fully described my invention, I claim as new and desire to secure by Letters Patent—

1. In loose wheels or pulleys having their hubs constructed with an interior oil recess or chamber in open communication with the bore of the hub, the combination, with the hub, of an oiling-tube in open communication with the exterior of the hub and arranged to project within said chamber to the full extent of the depth thereof, or thereabout, substantially as specified.

2. The combination, with the hub A' of a loose wheel or pulley having an oil recess or chamber, *b*, arranged to extend around the interior of the hub, of the oiling-tube C, arranged to project within said chamber and so that its inner end is in line, or thereabout, with the bore of the hub, essentially as shown and described.

WILLIAM P. DANIELL.

Witnesses:
THOMAS L. EVANS,
ELIJAH D. GREGORY,